(12) United States Patent
Han

(10) Patent No.: US 7,555,388 B2
(45) Date of Patent: Jun. 30, 2009

(54) METHOD FOR AUTOMATICALLY ZOOMING IN/OUT ON MAP IN NAVIGATION SYSTEM

(75) Inventor: Young Hoon Han, Icheon-Si (KR)

(73) Assignee: Hyundai Autonet Co., Ltd., Icheon-Shi Kyungki-Do (KR)

( * ) Notice: Subject to any disclaimer, the term of this patent is extended or adjusted under 35 U.S.C. 154(b) by 312 days.

(21) Appl. No.: 11/563,519

(22) Filed: Nov. 27, 2006

(65) Prior Publication Data

US 2007/0150189 A1 Jun. 28, 2007

(30) Foreign Application Priority Data

Dec. 13, 2005 (KR) .................. 10-2005-0122320

(51) Int. Cl.
*G01C 21/30* (2006.01)
(52) U.S. Cl. .................. 701/212; 701/208; 701/213; 340/995.15
(58) Field of Classification Search ......... 701/200–213; 340/995.14–995.18
See application file for complete search history.

(56) References Cited

U.S. PATENT DOCUMENTS

| 6,904,360 B2 * | 6/2005 | Pechatnikov et al. ........ 701/208 |
| 7,206,696 B2 * | 4/2007 | Furukawa ................... 701/210 |

FOREIGN PATENT DOCUMENTS

| JP | 10-318765 | 12/1998 |
| KR | 1019990010619 | 2/1999 |
| KR | 1020060054873 | 5/2006 |
| KR | 1020060067480 | 6/2006 |
| KR | 1020060106407 | 10/2006 |

* cited by examiner

*Primary Examiner*—Richard M. Camby
(74) *Attorney, Agent, or Firm*—IPLA P.A.; James E. Bame

(57) ABSTRACT

Provided is a method for automatically zooming in/out on a map in a navigation system. The method includes measuring a running speed; searching a lookup table for a running speed zoom factor based on the measured running speed; and automatically zooming in/out on the map depending on the searched running speed zoom factor, and displaying the zoomed in/out map.

6 Claims, 3 Drawing Sheets

METHOD FOR AUTOMATICALLY ZOOMING IN/OUT ON MAP IN NAVIGATION SYSTEM

CROSS REFERENCE

Applicant claims foreign priority under Paris Convention and 35 U.S.C. § 119 to the Korean Patent Application No. 10-2005-0122320, filed Dec. 13, 2005 with the Korean Intellectual Property Office.

BACKGROUND OF THE INVENTION

1. Field of the Invention

The present invention relates to a method for automatically zooming in/out on a map in a navigation system, and more particularly, to a method for automatically zooming in or out on a map, considering a running speed of a vehicle, in a navigation system.

2. Description of the Related Art

In general, a navigation system periodically measures a self position, searches a path from the measured position to a destination inputted by a user, and guides the user to the destination along the searched path.

When a driver is guided along the searched path, the navigation system zooms in on and displays a road that the driver intends to access at an intersection such as a crossroad, an elevated road, an underpass, and an interchange where a plurality of roads diverge like several branches. The navigation system zooms out on and displays the road again on a previous map scale when a vehicle passes through a diverging point and gets out of by a predetermined distance or more. This is to allow the driver definitely to check out an access road at a complex intersection.

However, the navigation system does not display a map on an original scale until it passes by a predetermined distance after zooming in on and displaying the map. Thus, it is difficult to know a whole to-go direction because the driver cannot see an entire road picture when the vehicle passes through the intersection at a relative fast speed.

As described above, the conventional navigation system has a drawback that it causes a driver's confusion in driving the vehicle because the driver cannot check out a whole path, in case where the vehicle passes through the intersection at a relative fast speed.

Also, the conventional navigation system has a drawback that driver's careful driving may be hindered because the driver has to directly press a zoom-out key or button so as to zoom out on the zoomed-in map at the intersection.

SUMMARY OF THE INVENTION

Accordingly, the present invention is directed to a method for automatically zooming in/out on a map in a navigation system that substantially overcomes one or more of the limitations and disadvantages of the conventional art.

One object of the present invention is to provide a method for automatically zooming in or out on a map, considering a running speed of a vehicle, in a navigation system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a method for automatically zooming in/out on a map in a navigation system including a storage unit for storing a lookup table defining a running speed zoom factor based on a running speed. The method includes measuring the running speed; searching the lookup table for the running speed zoom factor based on the measured running speed; and automatically zooming in/out on the map depending on the searched running speed zoom factor, and displaying the zoomed in/out map.

In another aspect of the present invention, there is provided a method for automatically zooming in/out on a map in a navigation system including a storage unit for storing a lookup table defining a zoom factor based on a running speed and a zoom-in factor at an intersection, and a global positioning system (GPS) module for receiving position data from each of a plurality of GPS satellites and calculating a self position. The method includes measuring the running speed; searching the lookup table for the zoom factor based on the measured running speed, and buffering the searched zoom factor; determining whether the current position measured by the GPS module is an access point of the intersection; adding the running speed zoom factor with an intersection zoom factor, and calculating an automatic zoom factor when it is determined that the current position is the access point of the intersection; and automatically zooming in/out on the map, which is displayed on a screen, depending on the calculated automatic zoom factor.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Figure 1:
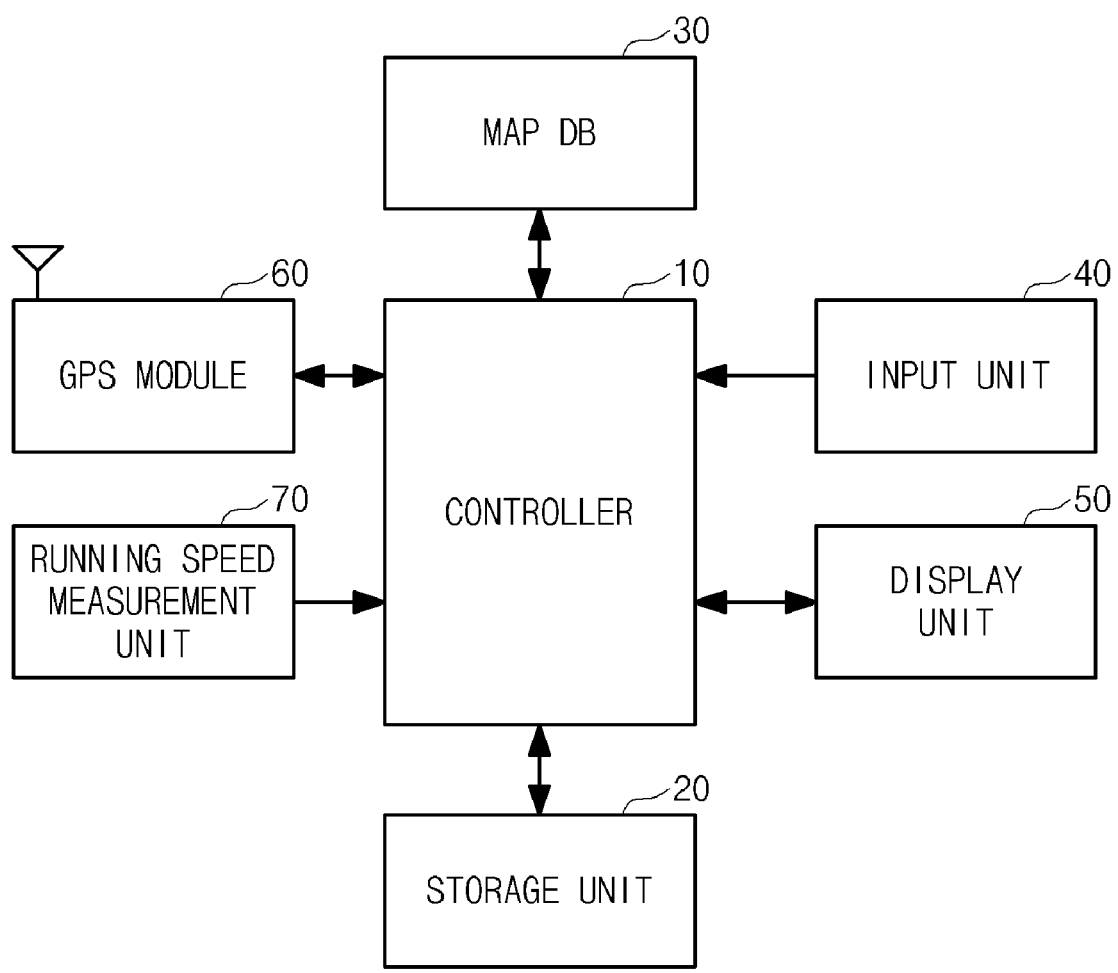
FIG. 1 is a block diagram illustrating a construction of a navigation system according to the present invention.

Reference will now be made in detail to the preferred embodiments of the present invention, examples of which are illustrated in the accompanying drawings. Wherever possible, the same reference numerals will be used throughout the drawings to refer to the same or like parts.

The present invention is to, in a path guidance mode, zoom out on and display a map for a path to a farther place when a running speed is high as at an expressway, and zoom in on and display the map when the running speed is low as at an intersection such as a crossroad.

Also, the present invention is to zoom in on the map, considering all both automatic zoom-in based on the intersection and automatic zoom-in based on the running speed of the vehicle, at the intersection such as the crossroad.

FIG. 1 is a block diagram illustrating a construction of a navigation system according to the present invention. The construction of the navigation system according to the present invention will be described with reference to FIG. 1.

The navigation system includes a controller 10, a storage unit 20, a map database (DB) 30, an input unit 40, a display unit 50, a global positioning system (GPS) module 60, and a running speed measurement unit 70.

The controller 10 controls a general operation of the navigation system.

The storage unit 20 includes a region for storing a control program for controlling an operation of the navigation system; a region for temporarily storing data generated in execution of the control program; and a region for storing a lookup table defining a running speed zoom factor on a per running speed basis according to a first exemplary embodiment of the present invention, or a region for storing a lookup table defining a running speed zoom factor on a per running speed basis and an intersection zoom factor according to a second exemplary embodiment of the present invention.

The map DB 30 stores map data.

The input unit 40 includes a plurality of keys including a zoom in/out key for zooming in or out on the map that is displayed on a screen. The input unit 40 outputs key data on the keys to the controller 10.

The display unit 50 receives and displays the map data on a predetermined area under the control of the controller 10.

The GPS module 60 receives position data from each of a plurality of GPS satellites, calculates a self position by the position data, and outputs the calculated self position to the controller 10.

The running speed measurement unit 70 measures and outputs the running speed of the vehicle to the controller 10, using a speed pulse.

Figure 2:
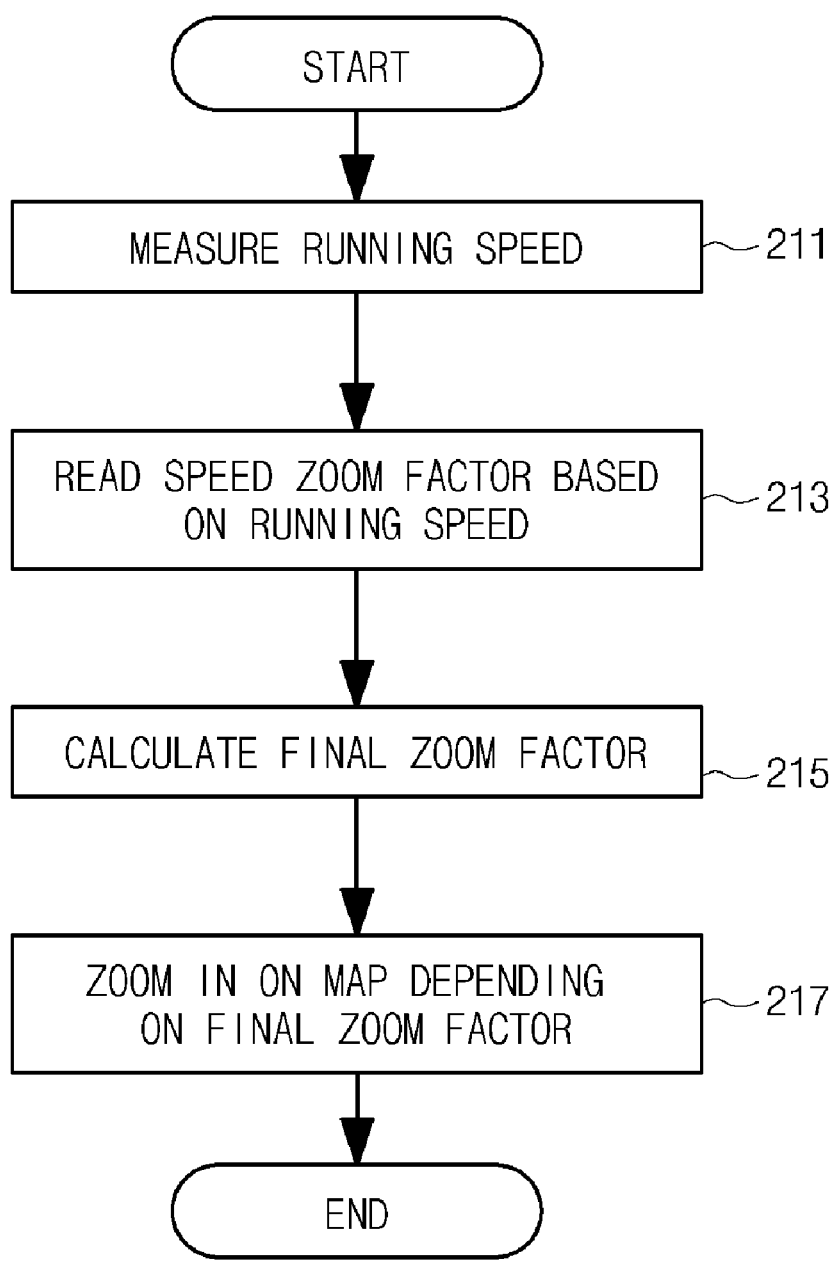
FIG. 2 is a flowchart illustrating a method for automatically zooming in/out on a map in a navigation system according to a first exemplary embodiment of the present invention.

FIG. 2 is a flowchart illustrating a method for automatically zooming in/out on the map in the navigation system according to a first exemplary embodiment of the present invention. A description will be made with reference to FIGS. 1 and 2 below.

In Step 211, the controller 10 measures the running speed of the vehicle by the running speed measurement unit 70, or measures the running speed of the vehicle by the self position periodically received from the GPS module 60.

After the measuring of the running speed, in Step 213, the controller 10 searches the lookup table stored in the storage unit 20 for the running speed zoom factor associated with the measured running speed, and reads the searched running speed zoom factor.

After the reading of the running speed zoom factor, in Step 215, the controller 10 adds the running speed zoom factor to a default zoom factor without condition, and calculates a final zoom factor. In Step 217, the controller 10 zooms in or out on the map depending on the final zoom factor, and displays the zoomed-in or out map on the display unit 50. Alternatively, the controller 10 can add the running speed zoom factor to a previous final zoom factor and calculate a new final zoom factor in the Step 215 and then, zoom in on the map depending on the new final zoom factor and display the zoomed-in map on the display unit 50 in the Step 217. The final zoom factor can be different in case where the map is zoomed-in and displayed using a user setting zoom factor greater than the default zoom factor, or in case where the map is zoomed-out and displayed using the user setting zoom factor less than the default zoom factor.

Figure 3:
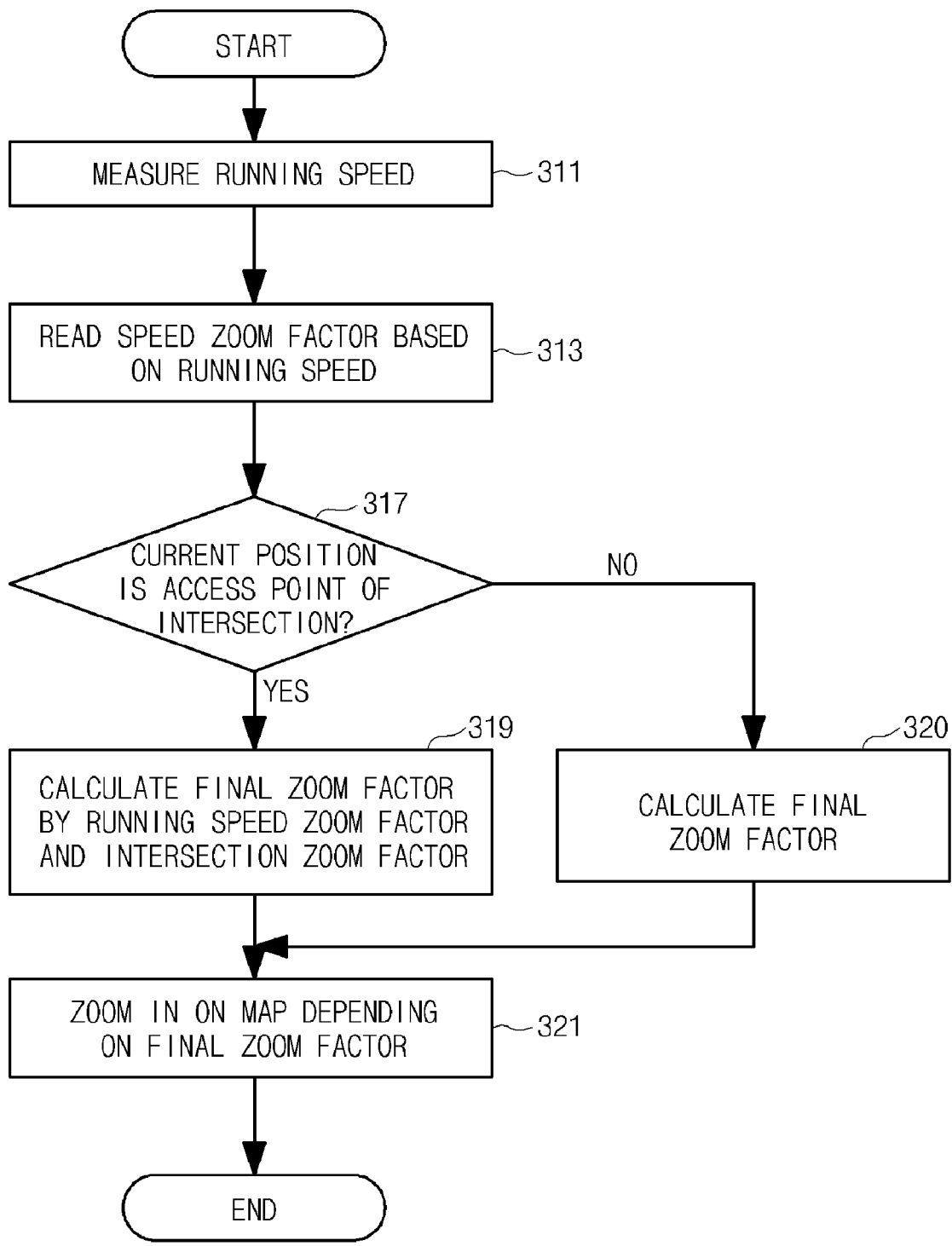
FIG. 3 is a flowchart illustrating a method for automatically zooming in/out on a map in a navigation system according to a second exemplary embodiment of the present invention.

FIG. 3 is a flowchart illustrating a method for automatically zooming in/out on a map in a navigation system according to a second exemplary embodiment of the present invention. A description will be made with reference to FIGS. 1 and 3 below.

In Step 311, a controller 10 measures a running speed of a vehicle by a running speed measurement unit 70 or a position periodically received from a GPS module 60.

After the running speed is measured, in Step 313, the controller 10 reads a running speed zoom factor, which is associated with the measured running speed, from a lookup table stored in a storage unit 20, and buffers the read running speed zoom factor.

After the Step 313, the controller 10 proceeds to Step 317, and determines whether a current position received from the GPS module 60 is an access point of an intersection when the current position is mapped. The access point can be a position far away by a predetermined distance before the intersection.

When it is determined that the current position is the access point of the intersection in the Step 317, in Step 319, the controller 10 adds the buffered running speed zoom factor of the storage unit 20 with a stored intersection zoom factor to calculate an automatic zoom factor, and adds the automatic zoom factor to a default zoom factor or a previous final zoom factor to calculate a final zoom factor.

After the final zoom factor is calculated, in Step 321, the controller 10 zooms in on the map in association with the calculated final zoom factor, and displays the zoomed-in map on the display unit 50.

When it is determined that the current position is not the access point of the intersection in the Step 317, in Step 320, the controller 10 adds only the buffered running speed zoom factor to the default zoom factor or the previous final zoom factor, and calculates a new final zoom factor. In the Step 321, the controller 10 zooms in on the map in association with the calculated final zoom factor, and displays the zoomed-in map on the display unit 50.

As described above, the present invention has an advantage that an access road of the intersection and the whole path can be displayed for the driver since the zoom factor is determined considering the running speed at the intersection, and the map is adaptively zoomed in/out depending on the determined zoom factor.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A method for automatically zooming in/out on a map in a navigation system including a storage unit for storing a lookup table defining a zoom factor based on a running speed and a zoom-in factor at an intersection, and a global positioning system (GPS) module for receiving position data from each of a plurality of GPS satellites and calculating a self position, the method comprising:

measuring the running speed;

searching the lookup table for the zoom factor based on the measured running speed, and buffering the searched zoom factor;

determining whether the current position measured by the GPS module is an access point of the intersection;

adding the running speed zoom factor with an intersection zoom factor, and calculating an automatic zoom factor when it is determined that the current position is the access point of the intersection; and automatically zooming in/out on the map, which is displayed on a screen, depending on the calculated automatic zoom factor.

2. The method according to claim 1, wherein the map is zoomed-in/out depending on the running speed zoom factor when it is determined that the current position is not the access point.

3. The method according to claim 1, wherein the map is zoomed-in using a new final zoom factor obtained by adding the automatic zoom factor to a previous final zoom factor.

4. The method according to claim 1, wherein the map is zoomed-in using a new final zoom factor obtained by adding the automatic zoom factor to a default zoom factor.

5. The method according to claim 2, wherein the map is zoomed-in using a new final zoom factor obtained by adding the running speed zoom factor to a previous final zoom factor.

6. The method according to claim 2, wherein the map is zoomed-in using a new final zoom factor obtained by adding the running speed zoom factor to a default zoom factor.

* * * * *